US006748385B1

(12) United States Patent
Rodkin et al.

(10) Patent No.: US 6,748,385 B1
(45) Date of Patent: Jun. 8, 2004

(54) DYNAMIC INSERTION AND UPDATING OF HYPERTEXT LINKS FOR INTERNET SERVERS

(75) Inventors: John J. Rodkin, San Francisco, CA (US); David E. Schmidt, La Jolla, CA (US)

(73) Assignee: National Broadcasting Company, Inc., New York, NY (US)

( * ) Notice: Subject to any disclaimer, the term of this patent is extended or adjusted under 35 U.S.C. 154(b) by 0 days.

(21) Appl. No.: 09/805,822

(22) Filed: Mar. 13, 2001

Related U.S. Application Data

(63) Continuation of application No. 09/432,828, filed on Nov. 2, 1999, now Pat. No. 6,581,065, which is a continuation of application No. 09/021,331, filed on Feb. 10, 1998, now Pat. No. 6,092,074.

(51) Int. Cl.[7] .............................................. G06F 17/30
(52) U.S. Cl. ......................................... 707/10; 707/102
(58) Field of Search .............................. 707/10, 102, 3, 707/100, 530; 713/164

(56) References Cited

U.S. PATENT DOCUMENTS 6,202,062 B1 * 3/2001 Cameron et al. ............... 707/3
6,292,802 B1 * 9/2001 Kessenich et al. .......... 707/101
6,446,076 B1 * 9/2002 Burkey et al. .............. 707/102
6,460,029 B1 * 10/2002 Fries et al. ..................... 707/3

OTHER PUBLICATIONS

Kao, B.; Lee, J.; Chi–Yuen Ng; Cheung; D. discloses Anchor point indexing in Web document retrieval (Systems, Man and Cybernetics, Part C: Applications and Reviews, IEEE Transactions, vol.: 30 Issue: 3, Aug. 2000; Page(s): 364–373).*

* cited by examiner

Primary Examiner—Diane D. Mizrahi
(74) Attorney, Agent, or Firm—Townsend and Townsend and Crew, LLP

(57) ABSTRACT

A system for automatically providing hypertext for character strings of a text file at a content server. A central server provides central control of the links of text files of a plurality of content servers in an information network such as the Internet. The central server intermittently updates each content server with new character strings and/or destination addresses, such as Uniform Resource Locators (URLs). The content servers also update the central server with new character strings. Optionally, each content server can query the central server on a real-time basis to obtain a destination address for a character string which does not have a corresponding valid destination address. The central server responds to such queries by searching its master databases, and using a search engine if required. Hit count data is maintained at the content servers and transmitted to the central server intermittently.

3 Claims, 6 Drawing Sheets

DYNAMIC INSERTION AND UPDATING OF HYPERTEXT LINKS FOR INTERNET SERVERS

This application is a continuation of U.S. patent application Ser. No. 09/432,828, filed Nov. 2, 1999, entitled "Dynamic Insertion and Updating of Hypertext Links for Internet Servers," now U.S. Pat. No. 6,581,065, which is a continuation of U.S. patent application Ser. No. 09/021,331, filed Feb. 10, 1998, entitled "Dynamic Insertion and Updating of Hypertext Links for Internet Servers," which is now issued as U.S. Pat. No. 6,092,074.

BACKGROUND OF THE INVENTION

1. Field of the Invention

The present invention relates to a method and apparatus for automatically providing hypertext anchor codes and destination addresses for a user-readable text file. The destination addresses are intermittently updated under the control of a central server to ensure that the destination addresses remain current. The invention is particularly suitable for use with text files which are stored on a server in a computer network such as the Internet.

2. Discussion

As the volume of information stored on computers continues to dramatically increase, new methods are sought to organize the information in an easy, intuitively retrievable way. Hypertext, which may include Hypertext Markup Language (HTML), Extended Markup Language (XML), or other forms of Standard Generalized Markup Language (SGML), is a common method of linking related computer files or pages. A file that references other information stored on a computer, whether directly or indirectly, generally displays an icon for the referenced information in some form of distinguished or highlighted text, usually colored or underlined. A computer user viewing the page can access the referenced document simply by selecting the highlighted text in the instant file, e.g., by clicking on the highlighted text with a mouse or other pointing device. A markup language anchor, or markup language hyperlink, is the reference icon on a Web page which links a user's Web browser to relevant information.

An HTML anchor, or HTML hyperlink, is the underlined text on a Web page which links a user's Web browser to another location. An HTML file includes text and HTML tags, and may also include graphics (e.g., hypermedia). Inside an HTML file, a tag is surrounded by angle braces "< . . . >". Text is displayed on the browser's screen with selected attributes such as font size and style. Tags are used to designate the current font, style, location, or to add images or convey other formatting details about the Web page to the browser.

Stand-alone tags and container tags may be used. Stand-alone tags involve one set of braces. For example, to put an image on the Web browser's screen, one might use:

<IMG SRC="picture.gif">

"IMG" refers to "image". "SRC", which refers to "source", is an attribute whose value is the name (i.e., source) of the file containing the image, e.g., "picture.gif". Container tags involve two sets of braces, namely one set to mark the beginning of a field, and another set of braces to mark the end of the field. HTML anchors are container tags. For example, to link the text "IBM" to the Uniform Ad Resource Locator (URL) "www.ibm.com", one might use:

<A HREF="http://www.ibm.net">IBM</A>

"<A>" is an anchor code in HTML. Note how the "</A>" indicates the end of the container tag that began with the "<A . . . >" tag. "HREF" refers to a hypertext reference attribute.

This form of hypertext, illustrated in FIG. 1, was originally conceived in March of 1989 by Tim Berners-Lee at the European Nuclear Council (CERN) as a method to disseminate information to geographically distributed researchers in high energy physics.

FIG. 1 is a block diagram of a static link architecture for linking a primary computer file to one or more destination files. Computer files, such as the primary computer file 100, are stored locally on individual Web servers, but the hypertext links are capable or referencing documents on distant servers. For example, the primary computer file 100 includes two hypertext words, "A" and "B". The traversal of "A" (i.e., the user selecting "A") links the user to a destination file 110, which contains text related to A. Similarly, the traversal of "B" links the user to a destination file 120, which contains text related to B. Generally, destination file A (110), destination file "B" (120) and the primary computer file 100 are each stored on physically separate servers, or computers.

The now familiar World Wide Web was launched publicly in January of 1992 when CERN opened its Web server to allow researchers to access data from the CERN server. Since then, the World Wide Web has seen incredible growth. Its uses now reach well beyond the international physics community.

The unprecedented growth in the World Wide Web has hastened the creation of more advanced methods of linking computer represented information. Graphics objects can now achieve the same linking functionality as traditional hypertext. However, these links are "hard coded". That is, the developer of a computer file using hypertext links (e.g., a Web developer) establishes connections for the links that remain static. The developer can manually reposition the links, but their static nature remains. One important problem facing the developer, then, is where to point the hard coded hypertext or graphics links. The developer must choose wisely, because the link will have to be manually changed later if the developer's preferences change.

Fortunately, the growth of the World Wide Web has also led to the development of multiple search engines, such as Yahoo™ and Lycos™, that allow a user to find needles of Web documents in the haystack of available information. The Web developer can locate URLs of desired computer files by entering keywords in the search engine and manually filtering the results. These search engines use primarily voluntary site registrations and Web user suggestions to develop and categorize large databases of URLs. These databases allow a user to find a desired Web document, and allow a developer to find a desired URL for static hypertext and graphics links.

However, even the capability of these search engines leaves the Web developer unsatisfied. Practical considerations preclude using static links for all available information because of screen size and storage limits. Information organized in real time when requested or "on the fly" according to a user's preferences overcomes the static hypertext limitation. Therefore, a primary area of development has been interactivity with Java™, ActiveX™, and Common Gateway Interface (CGI) scripts. Java™ and ActiveX™ enable a personal computer to run applications that help interactively retrieve and format requested information from a local or distant Web server. Similarly, CGI scripts allow the computer to launch an application on the currently accessed Web server that interactively retrieves and formats information. The Web developer can use these methods to give the user who accesses the page some control over which files are retrieved by various links.

For example, FIG. 2 is a block diagram of a dynamic link architecture for linking a primary computer file to one or more destination files. Here, a CGI script, Java Applet, or ActiveX control "A" (210) is responsive to a user input (200) for linking the hypertext "A" in the primary computer file 100 to the destination file "A" (110). Likewise, a CGI script, Java Applet, or ActiveX control "B" (220) is responsive to a user input (230) for linking the hypertext "B" in the primary computer file 100 to the destination file "B" (120).

Thus, the Web developer has two options for providing hypertext links in a primary computer file. The developer can insert static hypertext or graphics links using the search engines to determine the precise destination of the links. Alternatively, the developer can use an interactive method that allows the current user viewing the computer page to input preferences. These preferences are then used to filter, in real time, available files and retrieve the desired information.

However, these options suffer from two important disadvantages. First, the manual process by which static links are entered is tedious. A Web developer must find the desired destination URLs using available search engines and manually annotate the hypertext file with those URLs. If the developer's preferences later change, or if the URL is changed, the process must be repeated.

FIG. 3 illustrates the manual insertion of hyperlinks into a primary computer file. A primary computer file 300 contains text, such as a news article. At 310, manual link insertion must be performed by manually identifying the particular words in the primary computer file 300 which are to have links. Next, corresponding anchor codes and URLs which are written in an HTML format must be inserted into the primary computer file. Finally, the primary computer file 100 with the hypertext "A" and "B" is obtained.

A second disadvantage with existing techniques for providing hypertext links is that a Web developer must either provide static links or allow the user some control over the destination of those links. Dynamic links created with Java, ActiveX, or CGI scripts can disallow user input, but current methods would reduce such emasculated dynamic links to effectively static links. That is, the developer would have So modify such links manually, and that manual modification is the essence of a static link.

Accordingly, it would be desirable to provide a system which allows a Web developer to automatically enter hypertext links into a computer file such as a news article or other sequence of user-readable character strings. The system should also provide simple and central control over the destination of previously static links. The system should allow updating of the links without requiring further processing of the computer file. The system should also provide pre-assigned preferred destination addresses for specific character strings.

For destination addresses which are not pre-assigned, the system should provide the capability to search a computer network to assign an appropriate destination addresses. This search should be performed in accordance with preference criteria. The system should provide the capability to assign class codes to the specific character strings. Additionally, the system should assign expiration periods or dates to the destination addresses. The system should maintain a hit count of the character strings at each content server, and provide a capability for transmitting hit count data to the central server.

The present invention provides a system having the above and other advantages.

SUMMARY OF THE INVENTION

The present invention relates to a method and apparatus or automatically providing hypertext anchor codes and destination addresses for a user-readable text file at a content server. Central control over a plurality of content servers is also provided.

A hypertext link is provided for a character string of a text file or other computer information. The invention may be implemented in a variety of ways. For example, when the character strings are provided in a discrete file, anchor codes may be inserted into the file which reference destination addressees such as URLs which are stored in a separate database. Alternatively, the anchor codes may reference a database location which is subsequently provided with a destination address.

In another alternative, the anchor code and/or destination addresses may be associated with particular character strings using relational database programming techniques, such as Structured Query Language (SQL). Moreover, the association between the character strings and the destination addresses, or destination address locations, may be initiated in different ways.

For example, the association may be initiated under the control of an administrator of a content server on which the text files or other computer information is stored. Alternatively, the association may be initiated by a remote Web user who activates particular text or other icon on his computer screen. In another alternative, the association may be initiated by a central server which has the capability to provide control signals to the content server.

Regardless of the specific implementation, provision of a timely destination address for character strings in the text file or other computer information is provided.

A central server may provide central control of the links of text files of a plurality of content servers in an information network such as the Internet. The central server intermittently updates each content server with new character strings and/or destination addresses, and also receives new character strings from the content server.

Optionally, each content server can query the central server on a real-time basis to obtain a destination address for a character string which has no valid corresponding destination address at the content server. The central server responds to such queries by searching its master databases, and using a search engine if required, to obtain a destination address.

Hit count data may be maintained at the content servers and transmitted to the central server from time to time to allow tracking of links which are selected by Web users.

In one embodiment, a computer system provides hypertext links for a plurality of character strings including a first character string. The computer system comprises: an annotation database associated with a primary computer which comprises a plurality of linkable character strings; a destination database associated with the primary computer which comprises a plurality of destination addresses; and determining means associated with the primary computer for determining a matching linkable character string for the first character string, if present, in the annotation database; wherein the matching linkable character string is associated with at least one of the destination addresses.

The computer system may further comprise querying means associated with the primary computer for querying the destination database to obtain the at least one destination address corresponding to the matching linkable character string.

The computer system may further comprise means associated with the primary computer for providing an anchor code which relates the matching linkable character string to the at least one corresponding destination address to provide a hypertext link for the first character string.

The system can thus process each character string in an article to provide destination addresses for each user-readable character string which has a match in the annotation database. The anchor code is preferably maintained separate from the destination address so the destination address can be easily updated without modifying the anchor code.

Optionally, the annotation database further comprises a plurality of class codes which are associated with the plurality of linkable character strings; the matching linkable character string has a plurality of class codes associated therewith; the destination database comprises a plurality of destination addresses corresponding to the plurality of class codes of the matching linkable character string; querying means associated with the primary computer for querying the destination database to obtain the plurality of destination addresses corresponding to the associated plurality of class codes; and means associated with the primary computer for providing a plurality of anchor codes which relate the matching linkable character string to the corresponding plurality of destination addresses to provide a corresponding plurality of hypertext links for the first character string.

For example, one class code may designate a home page for the first user-readable character string, while a second class code designates a stock quote page for the first user-readable character string.

Optionally, writing means associated with the primary computer for writing a plurality of character strings into a primary computer file in which the first character string is carried to identify the corresponding plurality of hypertext links for the first character string.

The computer system may further comprise interface means such as a graphical user interface for receiving an administrator input which designates the first character string. That is, a content server administrator may select particular words to be linked if it is expected that the particular words are not already in the annotation database. The writing means is adapted to write a linkable character string corresponding to the first character string into the annotation database when the matching linkable character string is not present in the annotation database. Thus, the annotation database is updated with the new character string.

The computer system may further comprise interface means for receiving an administrator input which designates the first character string; transmitting means for transmitting the first character string to a central computer via a communication network when a linkable character string corresponding to the first character string is not present in the annotation database; wherein the central computer is adapted to provide a corresponding destination address; and receiving means for receiving the corresponding destination address from the central computer via the communication network.

Optionally, the writing means is adapted to update the destination database with the corresponding destination address received from the central computer.

The computer system may further comprise transmitting means for transmitting the first character string to a central computer via a communication network when a destination address corresponding to the first character string is not present in the destination database; wherein the central computer is adapted to provide a corresponding destination address; and receiving means for receiving the corresponding destination address from the central computer via the communication network.

Optionally, the writing means is adapted to update the destination database with the corresponding destination address received from the central computer.

The computer system may further comprise receiving means for receiving updated linkable character strings from a central computer via a communication network in an intermittent maintenance mode; wherein the writing means is adapted to update the annotation database with the updated linkable character strings.

The computer system may further comprise receiving means for receiving updated destination addresses from the central computer via the communication network in an intermittent maintenance mode; wherein the writing means is adapted to update the destination database with the updated destination addresses.

The computer system may further comprise qualifying means associated with the destination database for qualifying the at least one corresponding destination address according to an expiration date associated therewith.

Optionally, transmitting means responsive to the qualifying means are provided for transmitting the matching linkable character string to a central computer via a communication network if the associated expiration date of the at least one corresponding destination address has passed; wherein the central computer is adapted to provide an undated destination address corresponding to the matching linkable character string; and receiving means for receiving the updated destination address from the central computer via the communication network.

Optionally, the writing means is adapted to update the destination database with the updated destination address.

When at least some of the linkable character strings in the annotation database have an associated major class code, the computer system may further comprise qualifying means associated with the annotation database for qualifying the matching linkable character string according to qualification criteria which requires the major class code of the matching linkable character string to match a preferred major class code.

Optionally, interface means associated with the primary computer are provided for receiving an administrator input which designates the preferred major class code.

Receiving means may also be provided for receiving a signal indicative of the preferred major class code from a central computer via a communication network.

The computer system may further comprise record keeping means for maintaining hit count data relating to the plurality of character strings; and transmitting means for transmitting the hit count data to a central computer via a communication network.

The computer system may :further comprise interface means for receiving an administrator input which designates at least one character string or the plurality of character strings which does not have a corresponding matching character string in the annotation database; and transmitting means for transmitting the at least one character string to a central computer via a communication network for updating the central computer in an intermittent maintenance mode.

In a further embodiment, a computer system includes a central computer adapted to communicate with a plurality of primary computers via a communication network. The computer system comprises defining means associated with the central computer for defining a plurality of linkable character strings; an annotation database associated with the central computer for storing the plurality of linkable character strings; assigning means associated with the central computer for assigning at least one corresponding destination address to each of the linkable character strings; a destination database associated with the central computer for storing the assigned destination addresses; and transmitting means associated with the central computer for transmitting specific ones of the plurality of linkable character strings and specific ones of the destination addresses to the plurality of primary computers via the communication network in an intermittent maintenance mode.

The assigning means is adapted to communicate with a search engine for searching an information network using particular ones of the linkable character strings as search terms to obtain particular ones of the corresponding destination addresses.

Particular ones of the linkable character strings and particular ones of the corresponding destination addresses are accorded a preferred status such that the assigning means pre-assigns the particular ones of the corresponding destination addresses to the particular ones of the linkable character strings without searching an information network. The preferred status may be based on a payment received from a preferred provider, i.e., the operator of a particular Web page.

The computer system further comprises a destination filter associated with the assigning means for filtering destination addresses obtained from the search engine according to preference criteria to obtain the destination addresses which are assigned to the linkable character strings.

The computer system further comprises receiving means associated with the central computer for receiving a first character string from a particular one of the primary computers via the communication network; querying means associated with the central computer for querying the destination database to obtain at least one destination address corresponding to the first character string; and transmitting means for transmitting the at least one corresponding destination address to the particular primary computer via the communication network.

The computer system further comprises receiving means associated with the central computer for receiving designated character strings from the primary computers via the communication network in the periodic maintenance mode; the designated character strings being designated by an administrator input at the primary computers; and writing means associated with the central computer for updating the annotation database with the designated character strings if the designated character strings are not present in the annotation database.

Optionally, the assigning means is adapted to communicate with a search engine for searching an information network using the designated character strings as search terms to obtain corresponding destination addresses; and the writing means is adapted to update the destination database with the corresponding destination addresses.

Optionally, a screening filter is provided for screening the designated character strings to eliminate words that may have been improperly designated, e.g., including misspelled words, or common place words such as "the" or "a" which should not be linked to.

The assigning means may assign corresponding expiration period data to the assigned destination addresses; and the transmitting means may transmit the expiration period data to the plurality of primary computers via the communication network.

The assigning means is adapted to assign major class code data to the plurality of linkable character strings; the annotation database is adapted to store the major class code data; and the transmitting means is adapted to transmit the major class code data to the plurality of primary computers via the communication network.

The assigning means is adapted to assign a plurality of the corresponding destination addresses to at least one of the linkable character strings.

The computer system further comprises receiving means associated with the central computer for receiving hit count data from the primary computers via the communication network.

In a further embodiment, a method for providing hypertext links for a plurality of character strings, including a first character string, comprises the steps of: providing an annotation database associated with a primary computer which comprises a plurality of linkable character strings; providing a destination database associated with the primary computer which comprises a plurality of destination addresses; and determining a matching linkable character string for the first character string, if present, in the annotation database; wherein the matching linkable character string is associated with at least one of the destination addresses.

The method may comprise the further step of providing querying means associated with the primary computer for querying the destination database to obtain the at least one destination address corresponding to the matching linkable character string.

The method may comprise the further step of providing an anchor code which relates the matching linkable character string to the at least one corresponding destination address to provide a hypertext link for the first character string.

Optionally, the annotation database further comprises a plurality of class codes which are associated with the plurality of linkable character strings; the matching linkable character string has a plurality of class codes associated therewith; and the destination database comprises a plurality of destination addresses corresponding to the plurality of class codes of the matching linkable character string; in which case the method comprises the further steps of querying the destination database to obtain the plurality of destination addresses corresponding to the associated plurality of class codes; and providing a plurality of anchor codes which relate the matching linkable character string to the corresponding plurality of destination addresses to provide a corresponding plurality of hypertext links for the first character string.

The method may comprise the further step of writing a plurality of character strings into a primary computer file in which the first character string is carried to identify the corresponding plurality of hypertext links for the first character string.

Optionally, the method comprises the further steps of receiving an administrator input which designates the first character string; and writing a linkable character string corresponding to the first character string into the annotation database when the matching linkable character string is not present in the annotation database.

Optionally, the method comprises the further steps of receiving an administrator input which designates the first character string; transmitting the first character string to a central computer via a communication network when a linkable character string corresponding to the first character string is not present in the annotation database; wherein the central computer is adapted to provide a corresponding destination address; and receiving the corresponding destination address from the central computer via the communication network.

The destination database may be updated with the corresponding destination address received from the central computer.

Optionally, the method comprises the further steps of transmitting the first character string to a central computer via a communication network when a destination address corresponding to the first character string is not present in the annotation database; wherein the central computer is adapted to provide a corresponding destination address; and receiving the corresponding destination address from the central computer via the communication network.

The method may comprise the further steps of receiving updated linkable character strings from a central computer via a communication network in an intermittent maintenance mode; and updating the annotation database with the updated linkable character strings.

Optionally, the method comprises the further steps of receiving updated destination addresses from the central computer via the communication network in an intermittent maintenance mode; and updating the destination database with the updated destination addresses.

The method may comprise the further step of qualifying the at least one corresponding destination address according to an expiration date associated therewith.

The method may comprise the further step of transmitting the matching linkable character string to a central computer via a communication network if the associated expiration date of the at least one corresponding destination address has passed; wherein the central computer is adapted to provide an updated destination address corresponding to the matching linkable character string; and receiving the updated destination address from the central computer via the communication network.

Optionally, the destination database is updated with the updated destination address.

When at least some of the linkable character strings in the annotation database have an associated major class code, the method may comprise the further steps of qualifying the matching linkable character string according to qualification criteria which requires the major class code of the matching linkable character string to match a preferred major class code.

The method may comprise the further steps of receiving an administrator input which designates the preferred major class code.

The method may comprise the further steps of receiving a signal indicative of the preferred major class code from a central computer via a communication network.

The method may comprise the further steps of maintaining hit count data relating to the plurality of character strings; and transmitting the hit count data to a central computer via a communication network.

The method may comprise the further steps of receiving an administrator input which designates at least one character string of the plurality of character strings which does not have a corresponding matching character string in the annotation database; and transmitting the at least one character string to a central computer via a communication network for updating the central computer in an intermittent maintenance mode.

In a further embodiment, a method is presented for communicating with a plurality of primary computers via a communication network. The method comprises the steps of: defining a plurality of linkable character strings at a central computer; storing the plurality of linkable character strings in an annotation database associated with the central computer; assigning at least one corresponding destination address to each of the linkable character strings; storing the assigned destination addresses at a destination database associated with the central computer; and transmitting specific ones of the plurality of linkable character strings and specific ones of the destination addresses to the plurality of primary computers via the communication network in an intermittent maintenance mode.

The method may comprise the further steps of communicating with a search engine for searching an information network using particular ones of the linkable character strings as search terms to obtain particular ones of the corresponding destination addresses.

The method may comprise the further steps of filtering destination addresses obtained from the search engine according to preference criteria to obtain the destination addresses which are assigned to the linkable character strings.

The method may comprise the further steps of receiving a first character string from a particular one of the primary computers via the communication network; querying the destination database to obtain at least one destination address corresponding to the first character string; and transmitting the at least one corresponding destination address to the particular primary computer via the communication network.

The method may comprise the further steps of receiving designated character strings from the primary computers via the communication network in the periodic maintenance mode; wherein the designated character strings are designated by an administrator input at the primary computers; updating the annotation database with the designated character strings if the designated character strings are not present in the annotation database.

The method may comprise the further steps of communicating with a search engine for searching an information network using the designated character strings as search terms to obtain corresponding destination addresses; and updating the destination database with the corresponding destination addresses.

The features, objectives and advantages of the invention will become more apparent from the detailed description set forth below when taken in conjunction with the drawings, in which like reference designators refer to like elements throughout.

DETAILED DESCRIPTION OF THE INVENTION

The present invention relates to a method and apparatus for automatically providing hypertext anchors and destination addresses for a user-readable text file. Central control over the destination addresses of hyperlinks in a plurality of content servers is also provided.

The following definitions are provided:

Dynamic Decision Filter™—software such as a CGI script which has two parts. Part A is executed at a content server, while Part B is executed at a central server;

Dynamic Hypertext™—modified hypertext in accordance with the present invention;

Intelligent Annotator™—software that provides dynamic hypertext for an article to be annotated; may be implemented as a state machine at each content server; and Destination Address—a variable that designates the location of a network resource such as a Web page; may take the form of a URL.

Figure 1:
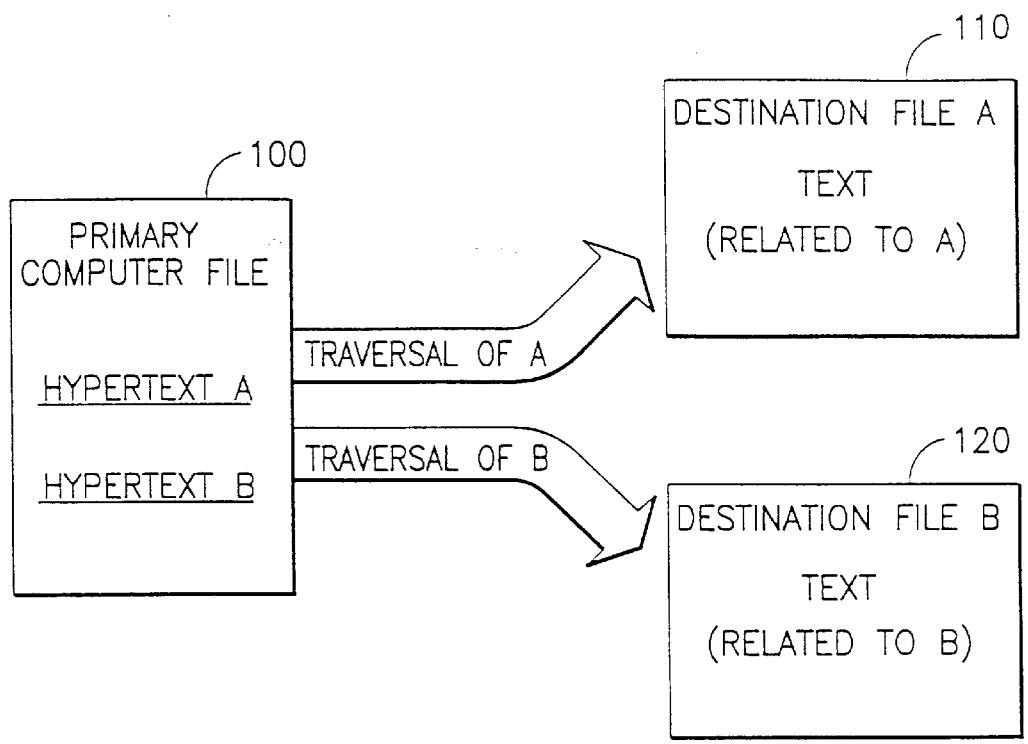
FIG. 1 is a block diagram of a static link architecture for linking a primary computer file to one or more destination files.
Figure 3:
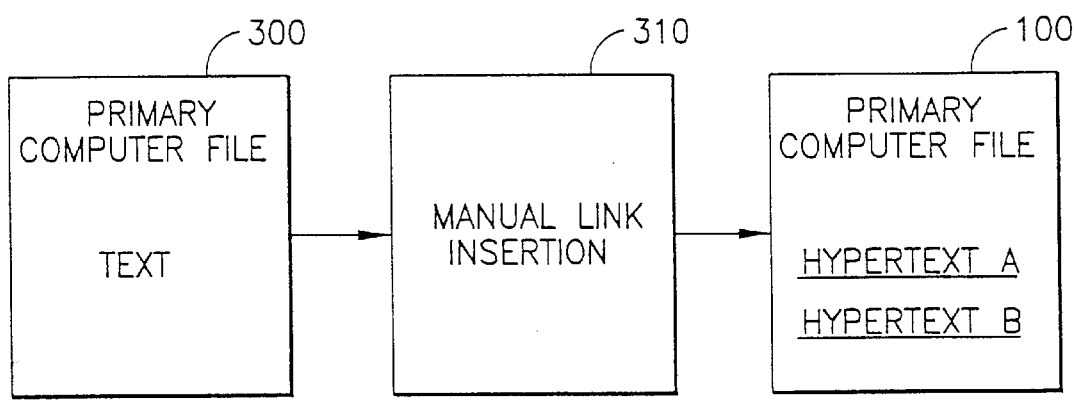
FIG. 3 illustrates the manual insertion of hyperlinks into a primary computer file.
Figure 2:
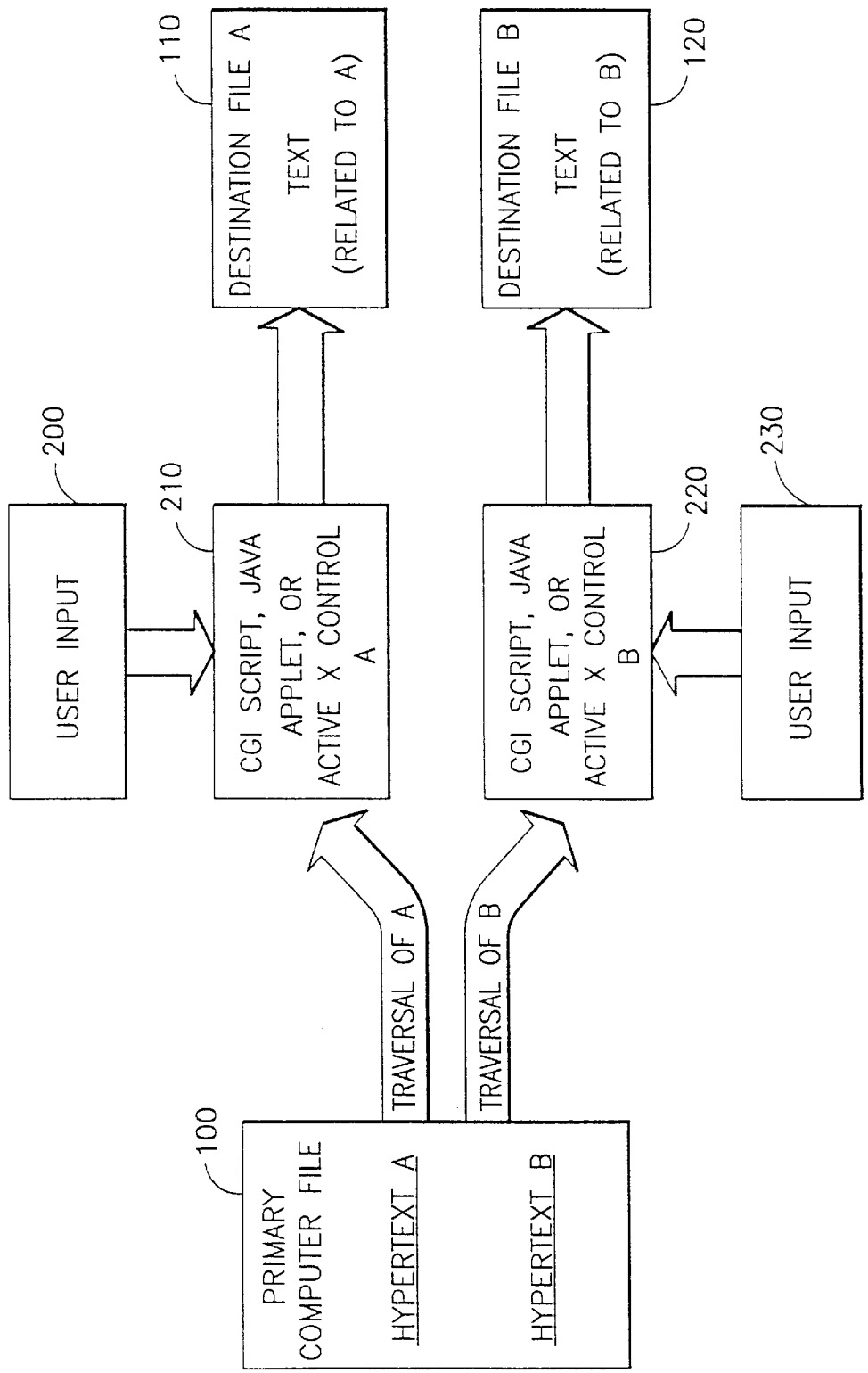
FIG. 2 is a block diagram of a dynamic link architecture for linking a primary computer file to one or more destination files.
Figure 4:
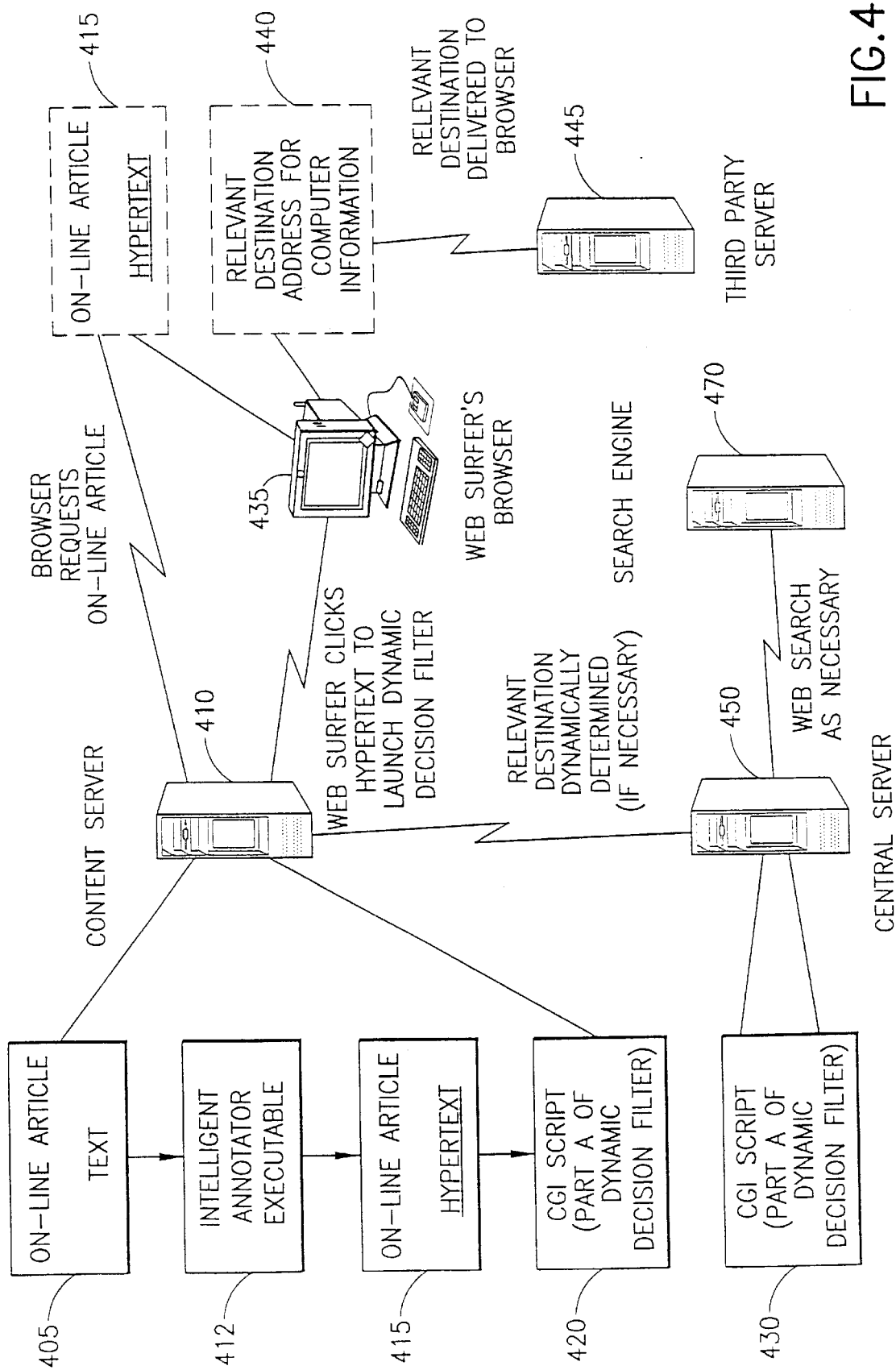
FIG. 4 is a conceptual diagram illustrating a global architecture of a computer system in accordance with the present invention.

FIG. 4 is a conceptual diagram illustrating a global architecture of a computer system in accordance with the present invention. A central server or computer 450 controls a plurality of content servers or computers, such as a content server 410. The central server 450 maintains a master database or specific words or phrases (e.g., character strings), as well as a database of corresponding destination addresses, such as URLs. Furthermore, the central server 450 operates in a maintenance mode wherein it intermittently updates each content server with particular ones of the character strings and destination addresses, e.g., on a daily or weekly basis. The intermittent update may be at fixed or varying intervals.

In Particular, the central server may updated the content servers with any new character strings or new or updated destination addresses. Also during the maintenance mode, data can be communicated from the content servers to the central server. This data can include hit count data and any new character strings which were identified at the content server. Accordingly, during the maintenance mode, both the content server and the central server are updated with new terms.

For example, for business applications, the character strings may be names of companies, including the formal name, nickname, and stock ticker symbol. To illustrate, the character strings "International Business Machines" and "IBM" may have a corresponding destination address of "www.ibm.com". The central server 450 may be updated to reflect new companies, such as initial public offerings (IPOs) as well as name changes, for example, due to mergers.

For sports applications, the central server 450 may maintain a database of sports teams, cities, and players, as well as corresponding destination addresses. For example, many professional sports teams and leagues maintain a home page. To illustrate, the character strings "National Football League" and "NFL" may have a corresponding destination address of "www.nfl.com".

The central server 450 may include a master annotation database which stores character strings which are associated with preferred destination addresses. One example is the use of a master annotation database for travel industry applications, where the master annotation database contains a listing of travel destinations, airlines, and so forth, which have corresponding preferred destination addresses in a destination address of the central server 450. Since several destination addresses may be suitable for a particular character string, one or more particular destination addresses may be accorded a preferred status by the central server administrator on a pay basis. Preferred destination address are operated by preferred providers.

A master annotation database may also store general purpose character strings which do not fall into a particular category. The implementation and functions of a master annotation database are discussed in greater detail below in connection with FIG. 5.

Referring again to FIG. 4., the central server 450 runs a CGI script, shown at function 430, which is referred to herein as "Part B" of a Dynamic Decision Filter™. A counterpart "Part A" of the Dynamic Decision Filter, shown at function 420, is run in the content server 410 and is described hereinafter.

The central server 450 may perform Web searches using a search engine 470 to obtain destination addresses for the character strings. Generally, preferred destination addresses will be pre-assigned to the character strings at the central server 450 so no search is needed to obtain the destination address.

When the destination addresses are not pre-assigned, the search engine 470 searches a computer network such as the Internet using a particular character string as a search term to obtain one or more candidate destination addresses. The candidate destination addresses can be filtered according to preference criteria to obtain one or more destination addresses which are then assigned to the particular character string. The preference criteria may designate a particular type of web site, e.g., business, sports or travel, from which the candidate destination addresses are obtained.

The content server 410 generally is physically separated from the central server 450 but communicates with the central server 450 via a conventional communication network. The content server 410 processes an on-line text article 405 using an executable Intelligent Annotator™ 412 to automatically associate hypertext anchor codes with various character strings in the article. A resulting on-line article with hypertext 415 can be produced and stored locally on the content server 410. Alternatively, computer information (e.g., digital data) can be provided to a Web user which displays the annotated article with hypertext 415, but the annotated article with hypertext 415 need not be pre-processed and stored as a discrete file. The hypertext in the article 415 is termed Dynamic Hypertext™ in accordance with the present invention.

The content server 410 may provide hypertext links only for character strings in the on-line article 405 which match a local database of stored character strings at the content server, and/or which have no corresponding destination address. If a character string in the on-line article 405 does not match the database of stored character strings or has no corresponding destination address, no link is provided.

However, by providing a "content server administrator input," a capability can be implemented for specifically designating a hyperlink for a particular character string in the article 405 that does have a corresponding destination address, and/or no match in the database of stored character strings. In this case, the corresponding destination address is dynamically determined, e.g., in real time, by having the content server 410 communicate the unmatched character string to the central server 450. This character string may be present at the central server 450 if the central server has not yet updated the content server 410 with the new character string and corresponding destination address. Alternatively, there may be no corresponding destination address for the character string at the central server 450, in which case a Web search is performed by the central server 450 via search engine 470.

The content server 410 may need to contact the central server 450 even if a matching destination address is found for a particular character string, for example, if the matching destination address has expired and therefore may be "stale".

A Web surfer's browser 435 communicates with the content server 410 to access the on-line article with hypertext 415. The Web surfer clicks on (or otherwise selects) the hypertext in the on-line article 415 to launch CGI script 420, referred to as "Part A" of the Dynamic Decision Filter™. Part A of the Dynamic Decision Filter™ provides a relevant destination address for computer information 440. The Web surfer's browser 435 then communicates with a third party server 445, which delivers the relevant destination to the browser 435, e.g., in the form of the designated Web page.

Figure 5:
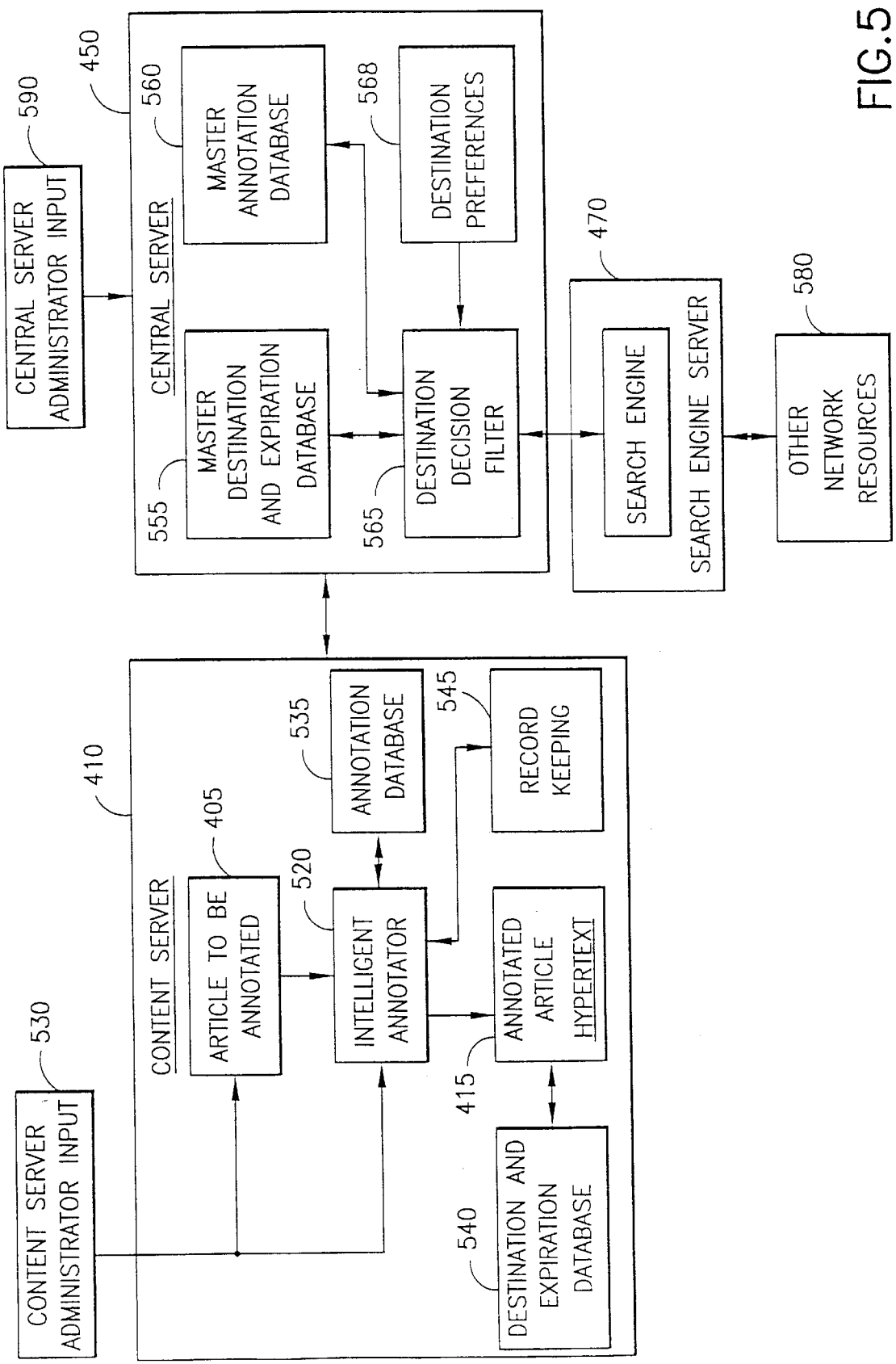
FIG. 5 illustrates a central server and content server in accordance with the present invention.

FIG. 5 illustrates a central server and content server in accordance with the present invention. Like-numbered elements in FIGS. 4 and 5 correspond to one another. The central server 450 provides character strings and corresponding destination addresses, such as URLs, preferably to a large number of content servers in a network.

A server, or file server, refers to a computer system with data storage that allows different users to access the data storage via a computer network. In a client-server interaction, a client forwards a file request. The server accepts the client's request, performs the associated operation (e.g., open, close, read, write, or seek), and returns a response to the client. The content server 410 need not be a server, strictly speaking, and therefore may be alternatively be referred to as a "content computer." The central server 450 may be referred to as a "central computer".

The central server 450 communicates with a search engine server and search engine 470, which in turn communicates with other network resources 580, such as other content servers.

Generally, the central server 450 communicates with a large network of content servers (including content server 410) on an intermittent basis, such as daily or weekly. In this manner, each content server can be provided with updated destination addresses and corresponding key words or phrases (e.g., character strings) which provide a link to the destination addresses. Additionally, the content servers will have a chance to provide the central server with new character strings, hit count data, and other housekeeping data, such as current software version.

A master annotation database 560 associated with central server 450 maintains a listing of words and phrases which are of interest. The words and phrases may be related to specific subject areas, such as business, sports, travel, books, compact discs, and so forth, by assigning class codes to the various subject areas.

A destination decision filter 565 may obtain destination addresses for each of the character strings in the master annotation database 560 by communicating with the search engine 470 which, as indicated in FIG. 5, can reside in a search engine server. The destination addresses are stored in a master destination and expiration database 555. A central administrator input 590 may communicate with each function in the central server 450 to enable updates and modifications to be made to the central server software. Expiration dates may be assigned to the destination addresses by the central server 450 so that a new destination address is obtained for a particular character string upon the expiration of the old destination address. For example, an expiration period of ninety days may be used. Expiration date data may designate a particular calendar date, or may indicate a countdown period.

Destination preferences 568 may influence the destination decision filter 565 so that preferred addresses are selected. For example, particular destination addresses may be assigned a preferred status upon payment of a fee, or based on other proprietary interest.

Moreover, the central server 450 may pre-assign a preferred destination address to a character string so that no search is performed. For example, various organizations have Web pages which provide free movie reviews. However, those organizations which receive the most visitors, e.g., have the highest "hit count", will be able to sell advertising space on their Web page at a higher rate. Accordingly, a particular organization may pay the central server administrator a fee to have that organization's Web page set up as a link in on-line articles which relate to movies.

Accordingly, various character strings relating to movies can be assigned to a preferred destination address. These character strings might include names of movies, actors and actresses, and directors. The preferred organization provides the desired destination address to the central server administrator, who in turn updates the master annotation database 560 and master destination and expiration database 555 via input 590.

The content server 410 includes an Intelligent Annotator™ 520, an article to be annotated 405, a content server administrator input 530, an annotation database 535, a destination and expiration database 540, an annotated article 415, and a record keeping function 545. Computer information regarding the article to be annotated 405 is processed by the Intelligent Annotator 520. This computer information may be a discrete computer file, which may or may not have existing hypertext. However, there is no requirement that the article to be annotated is stored in a discrete computer file, and the computer information regarding the article to be annotated 405 may be provided in essentially any format, and from any source.

Data provided by the content server administrator (e.g., Web master) from a publisher or the like may be optionally provided via input 530. The input 530 may be a graphical interface which allows a person to select particular words in an article which are to be linked, or a computer program such as a script which automatically implements the administrator's preferences without requiring a manual user input.

The Intelligent Annotator™ 520 processes the computer information regarding the article to be annotated 405 to associate a destination address or destination address location with particular character strings in the article to be annotated 405. This association may be realized in a variety of ways. For example, the Intelligent Annotator™ 520 may output a discrete annotated article 415 which is subsequently stored in memory on the content server 410. The annotated article 415 may be a new computer file, or a computer file which is a re-written version of the article to be annotated 405.

The output computer information need not be stored as a discrete file for subsequent retrieval. Instead, it is possible to output a file or other computer information for viewing by a user whenever the user activates a particular character string of the article to be annotated. This computer formation may optionally combine a prepared background or template with the annotated text which the user views. Thus, the computer information viewed by the user appears as a markup language like file, but the commuter information is processed by the Intelligent Annotator™ 520 each time the user accesses the information.

The Intelligent Annotator™ 520 may correlate entries in the database using any of several well known matching algorithms.

Upon receipt of an article to be annotated, the Intelligent Annotator™ scans the file to determine matching strings from the annotation database 535. One rapid way to scan a large input character string for matching text is with a Discrete Finite Automata (DFA), or state machine, since the Intelligent Annotator™ 520, implemented as a state machine on a computer, does not have to compare any entire strings. Instead, it only compares one character at a time to see which path to take, and thus which state to go to next.

The character strings from the annotation database, i.e., the strings which are searched, can therefore be used by annotator software of the Intelligent Annotator™ 520 to automatically build a DFA whose terminal states indicate that a matching character string from the annotation database 535 has been found in the article to be annotated 405. Once a matching character string is found, the Intelligent Annotator™ 520 provides an anchor code which references a destination address in the destination and expiration database 540.

The anchor code may be associated with the matching character string in a variety of ways. For example, as illustrated in the example below, anchor codes may be inserted into the article to be annotated 405 next to the matching character string. However, the anchor code may alternatively be associated with the matching character string using relational database techniques, such as such as SQL. Each character string in the article to be annotated 405 may be referenced according to a bit count position, and the anchor code may be associated with a particular character string according to the corresponding bit count.

For example, the article to be annotated 405 as viewed by a Web user may be a business article which reads:

"NEW YORK—Stocks fell modestly yesterday as the technology sector stumbled. At 11 a.m. on Wall Street, the Dow Jones industrial average was down 24.12. The technology-heavy NASDAQ composite index was also down due in part to discouraging profit forecasts from IBM."

The Intelligent Annotator™ traverses the text of the article. That is, each word or phrase is examined to determine whether the text should be converted to hypertext. Moreover, for words or phrases which already have conventional hypertext anchors, the new anchor data in accordance with the present invention can either overwrite the old anchor data, or be inserted along with the old anchor data. Therefore, the article to be annotated 405 may be a text file with no hyperlinks, or a file with conventional hyperlinks. Additionally, as mentioned, the article to be annotated need not be a discrete file, but may comprise computer information from any source, and in any format.

The corresponding annotated article 415 as viewed by a Web user may read:

"NEW YORK—Stocks fell modestly yesterday as the technology sector stumbled. At 11 a.m. on Wall Street, the Dow Jones industrial average (home|quote) was down 24.12 points. The technology-heavy NASDAQ (home|quote) composite index was also down due in part to discouraging profit forecasts from IBM (home|quote)."

The hypertext is shown as underlined text. Additionally, color or other font attributes may be used. The hypertext "NEW YORK" may be pointed to by a user to activate a hypertext link to a corresponding URL which is stored in the destination and expiration database 540. Similarly, the hypertext "Wall Street" may be pointed to by a user to activate a hypertext link to its corresponding URL in the destination and expiration database 540.

The hypertext for the character strings "Dow Jones industrial average", "NASDAQ", and "IBM" offers two choices with the associated hypertext "(home|quote)". Activation of the hypertext "home" which is associated with the character string "Dow Jones industrial average" will lead the user to a corresponding Dow Jones industrial average home page whose URL is stored in the destination and expiration database 540. This home page might provide the user with general information regarding the Dow Jones industrial average and its parent company, Dow Jones, Inc. The linking of the hypertext to the corresponding destination address is achieved by Part B of the Dynamic Decision Filter™.

Likewise, activation of the hypertext "quote" which is associated with the character string "Dow Jones industrial average" will lead the user to a corresponding quote page whose URL is stored in the destination and expiration database 540. This quote page would provide a current quote of the value of the Dow Jones industrial average.

Similarly, hypertext links to home pages for NASDAQ and IBM are provided. The quote page for NASDAQ and IBM can be the same as the quote page for Dow.

When two or more hypertext links are provided for a character string in the article to be annotated 405, the two or more corresponding hypertext words can be inserted immediately after the character string. When only one hypertext link is provided for a character string, the character string itself can become the hypertext. However, for one hypertext link, it is also possible to insert a hypertext word or words (e.g., "home") which describes the link.

The example article to be annotated 405 may be provided using the following HTML:

"<!start_tag>

<p> NEW YORK—Stocks fell modestly yesterday as the technology sector stumbled. At 11 a.m. on Wall Street, the Dow Jones industrial average was down 24.12. The technology-heavy NASDAQ composite index was also down due in part to discouraging profit forecasts from IBM.

<p>

<!end_tag>"

The annotated article 415 output from the Intelligent Annotator™ 520 may be provided using the following HTML:

"<!start_tag>

<p> <a href="/cgi-in/sw?t=NEW+YORK&c=home">NEW YORK</a>—Stocks fell modestly yesterday as the technology sector stumbled. At 11 a.m. on <a href="/cgi-bin/sw?t=Wall+Street&c=home">Wall Street</a>, the Dow Jones industrial average (<a href="/cgi-bin/sw?t=Dow+Jones+industrial+average&c=home">home</a>|<a href="/cgi-bin/sw?t=Dow+Jones+industrial+average&c=quote">quote </a>) was down 24.12. The technology-heavy NASDAQ (<a href="/cgi-bin/sw?t=NASDAQ&c=home">home</ a>|<a href="/cgi-bin/sw?t=NASDAQ&c=quote">quote</a>) composite index was also down due in part to discouraging profit forecasts from IBM (<a href="/cgi-bin/sw?t=IBM&c=home">home</a>|<a href="/cgi-bin/sw?t=IBM&c=quote">quote</a>).

<p>

<!end_tag>"

The term <a> is HTML which designates a hypertext anchor. The Intelligent Annotator™ 520 associates anchor codes and corresponding destination addresses with the matched character strings. In one embodiment, the Intelligent Annotator™ 520 inserts anchor codes into the annotated article 415 to identify the corresponding destination address in the destination and expiration data base 540. Alternatively, relational database techniques may be used.

For example, the anchor code for the character string "Wall Street" is:

"/cgi-bin/sw?t=Wall+Street&c=home".

This anchor code references a directory "cgi-bin" of source code used by the Intelligent Annotator™ 520. Additionally, "sw" references Part A of the Dynamic Decision Filter™, thereby launching the corresponding script, while "t=" precedes the applicable text (e.g., Wall Street), and "c=" precedes the applicable minor class (e.g., home), discussed below. This source code may be written in C++ or any other suitable programming language, and stored on the content server 410. The Intelligent Annotator™ 520 can be run through a graphical user interface (GUI) or through a script used to automate other aspects of Web page development. Additionally, within the directory "cgi-bin", the character string "Wall Street" references a destination address, which is a home page for Wall Street, e.g., "http://www.wallstreet.com".

As an example of a character string of the article to be annotated 405 which has two destination addresses, refer to the two anchor codes for Dow Jones industrial average. The anchor code for the "home" page is:

"/cgi-bin/sw?t=Dow+Jones+industrial+average&c=home".

Moreover, within the directory "cgi-bin", the hypertext "home" of the annotated article 415 for the character string "Dow Jones industrial average" references a destination address which is a home page for the Dow Jones industrial average, e.g., "http://www.djia.com".

The anchor code for the "quote" page is:

"/cgi-bin/sw?t=Dow+Jones+industrial+average&c=quote".

Within the directory "cgi-bin", the hypertext "quotes" of the annotated article 415 for the character string "Dow Jones industrial average" references a destination address which is a quote page, e.g., "http://www.quotes.com".

Advantageously, the present invention allows the destination addresses in the database 540 to be changed without changing the annotated article. That is, the destination address which is referenced by a given anchor code can be changed over time. For example, the anchor code for "quote" mentioned above may initially reference the destination address "http://www.quotes.com" which is provided by Company A. However, a competing company, such as a stock broker, Company B, may pay the central server administrator to update the master destination and expiration database 555 with the preferred destination address of Company B, e.g., "http://www.companyB.com".

When the next periodic update of the content servers occurs, the central server 450 will transmit the updated destination address to the content server 410 for storage in the destination and expiration database 540. Then, the next time a Web surfer activates the anchor code for "quote" mentioned above, a link to the preferred destination address of Company B will occur.

It will be appreciated that a mechanism is required to determine which character strings (e.g., words or phrases) in the article to be annotated 405 are actually annotated, e.g., provided with hypertext. The annotation database 535 achieves this goal by storing a list of character strings which are intermittently received from the central server 450 during the central server's maintenance mode Additionally, one or more major and/or minor class codes may be associated with each character string in the annotation database 535. As a brief illustration, the annotation database 535 may have the following format:

Major Class Codes:
100=business
200=sports

Minor Class Codes:
1=home page
2=stock quote
3=news stories
4=team scores

| Character string | Major Class | Minor Class |
|---|---|---|
| Class(es) | | |
| Compaq | 100 | 2, 3 |
| IBM | 100 | 1, 2, 3 |
| International Business Machines | 100 | 1, 2, 3 |
| Merck | 100 | 2, 3 |
| Micron | 100 | 2, 3 |
| Viasat | 100 | 1, 2, 3 |
| NFL | 200 | 1 |
| National Football League | 200 | 1 |
| San Diego Padres | 200 | 1, 3, 4 |

The Intelligent Annotator™ 520 compares each character string in the article to be annotated 405 to the character strings in the annotation database 535 to see if there is a match. If there is no match, no hypertext is provided for the unmatched character string unless instructions are entered via the content server administrator input 530 to provide a link for a specific character string or strings.

The content server administrator input 530 may be used to specifically request that a particular character string be linked. A user interface may be provided to allow the content server administrator to perform this function easily, for example, by highlighting the particular character string on a display (not shown) associated with the content server. If the particular character string is not present in the annotation database 535, and/or there is no corresponding destination address, the content server 410 transmits the character string to the central server 450, preferably in real time, where a check is made to see if a destination address is available for the character string in the master destination and expiration database 555.

A match for the character string may be available in the master destination and expiration database 555 but not in the destination and expiration database 540 if the content server 410 has not yet been provided with the updated character string and destination address in the most recent periodic update.

If no destination address is available for the character string in question at the master destination and expiration database 555, the master annotation database 560 is optionally updated with the new character string, and the search engine 470 is used to search the other network resources 580 using the character string as a search term. Other search terms may be used, for example, according to the class of the character string. Once an appropriate destination address is obtained, the database 555 is updated with the new address, and the new address is transmitted to the content server 410 and stored in the destination and expiration database 540. Thus, the content server is provided with the new destination address in real-time.

Finally, in the next periodic update performed by the central server 450, each content server will be updated with the new character string and corresponding destination address so that all content servers will have consistent, updated data.

However, if a match is found between the current character string of the article to be annotated 405 and the character strings in the annotation database 535, the Intelligent Annotator™ 520 inserts an anchor code into the article to be annotated 405 to associate the matched character string with the corresponding destination address in the destination and expiration database 540. The content server administrator input 530 may optionally have a veto power to prevent the linking of specific character strings.

The character strings in the annotation database 535 are termed "linkable character strings". Moreover, the character strings in the article to be annotated 405 are meant to designate sequences of words, letters, numbers or virtually any other visual communication token. Additionally, while the character strings of the article to be annotated 405 and the annotation database 535 generally are user-readable words and/or numbers, it will be appreciated that it is possible to encode the character strings to produce corresponding code words, and to compare the code words to determine a match. For example, some comparison algorithms may operate more efficiently using code words. However, this is consider to be essentially the same as comparing the character strings themselves, prior to coding, and the present invention is meant to encompass such a variation.

Alternatively, the Intelligent Annotator™ 520 may insert the destination address itself, e.g., a URL, rather than an anchor code as described above, into the article to be annotated. However, the use of an anchor code which references the actual destination address is preferable since this allows the destination address to be later updated without requiring additional Processing of the annotated article 415.

The use of major and/or minor classes with the annotation database 535 is optional. If no class is used, the anchor code is inserted into the article to be annotated 405 without further qualification. Optionally, the anchor code may not be inserted into the article to be annotated 405 until it is confirmed that there is a match between the current character string of the article to be annotated 405 and a linkable character string of the annotation database, and/or the destination address referenced by the anchor code has not expired. However, if a major class is selected, the matching character string of the annotation database must have the same class as the selected major class to be qualified as a match.

The major class for a particular linkable character string is preferably assigned by the central server 450 to maintain consistency among all the content servers, and to reduce the content server administrator's workload. Thus, data indicative of the major class can be stored in the master annotation database 560. The major class can prevent inappropriate links for a character string which is used in different contexts. For example, the character string "New York" will have a different context depending on whether it is referring to the major class of tourism (e.g., New York Bureau of Tourism) or to the major class of sports (e.g., New York Yankees).

Alternatively, it is possible to have the major class assigned to the linkable character strings in the annotation database 535 by the content server administrator input 530, or by a default setting.

Moreover, although the major class codes may not be assigned to the linkable character strings in the annotation database 535 by the content server administrator input 530, the content server administrator input 530 is preferably used to select which major class code of matching linkable character strings is desired. For example, if the content server administrator knows that a particular article to be annotated 405 relates to business, the content server administrator should select a major class code of "100" so that matching linkable character strings with other major class codes are bypassed.

If a matching linkable character string with the selected major class code is not present in the annotation database 535, and/or there is no corresponding destination address, the content server 410 contacts the central server 450 as discussed previously to obtain an appropriate destination address in real time from the central server 450.

For example, assume a major class of "200" for "sports" is selected. In this case, even though the character string "IBM" has a match in the annotation database 535, no anchor code will be provided for "IBM" since the major class (e.g., "100" for IBM) does not match, and no corresponding destination address is available. Note that, even if there is no match in the annotation database 535 for a particular character string, it is still possible to insert an anchor code which references a blank space in the destination database 540 which may subsequently be provided with an address. The anchor code may be thought of as a coordinate which identifies a space, such as a table entry, in the destination database 540.

Furthermore, one or more minor classes can be used to control the number and type of hypertext links which are provided for the matched character string in the article to be annotated 405. For example, if "IBM" is the matched character string, the major class (e.g., 100) matches, and minor classes "1" and "2" are selected (but not minor class "3"), then two anchor codes will be provided. One anchor code will reference a destination address in the destination and expiration database 540 for a home page (class "1"), while the other anchor code references a destination address in the destination and expiration database 540 for a stock quote page (class "2").

Generally, it is preferable for the central server 450 to assign the minor classes to the linkable character strings to maintain consistency among all of the content servers. Thus, the master annotation database 560 will maintain information regarding both the major and minor classes, if any, for each linkable character string.

The content server administrator input 530 may be used, however, to select which minor class codes are activated, thereby controlling which anchor codes are inserted into the annotated article 415.

In the above examples where it was indicated that a content server administrator input 530 may be used, generally such input is optional as the present invention provides the capability for fully automatic insertion of hypertext link codes into the article to be annotated. All relevant settings can be determined by the central server 450, or by default settings of the content server 410, to minimize the work load of the content server administrator.

The destination addresses which are stored in the destination and expiration database 540 may optionally have associated expiration dates or periods. The destination addresses and expiration date data are transmitted from the central server 450 to the content server 410 and to other content servers, not shown, intermittently on an unprompted basis, or in real-time if requested by a particular content server.

A record keeping function 545 can maintain a hit count which indicates the number of times a particular character string in the annotated article 415 is activated, e.g., by having a Web surfer click on the hypertext. This record keeping data can be intermittently downloaded to the central server 450, e.g., for billing purposes. The record keeping data may be downloaded to the central server 450 whenever the content server 410 queries the central server 450 with an unmatched character string, or with a matched linkable character string which has an expired destination address. Alternatively, the record keeping data for a particular destination address in the destination and expiration database 540 may be downloaded to the central server 450 upon expiration of the particular destination address. Or, the record data may be downloaded to the central server on an intermittent basis, during the maintenance mode discussed previously.

It will be appreciated that it is desirable to limit the number of communications between the central server 450 and the various content servers due to limited bandwidth of the communication network.

Hit count data can be used for various purposes. For example, an increase in the hit count of a particular preferred destination address can be tracked by the central server 450 to demonstrate the effectiveness of the preferred address status.

Once the article to be annotated 405 has been processed by the Intelligent Annotator™ 520, the annotated article with hypertext 415 is stored on the content server 410. Additional articles may be annotated and stored on the content server for access by Web browsers. Alternatively, the article to be annotated 405 may be processed repeatedly each time it is accessed by a user, as discussed previously, but not stored in the final HTML format.

Regarding the respective databases of the content server 410 and the central server 450, it will be appreciated that the databases may be organized in a variety of ways, and there is no requirement that each database be physically separate. For example, the annotation database and the destination and expiration database may be stored on a common memory element which is divided into separate memory spaces. Moreover, the destination address and expiration date data at both the content server and the central server need not be stored in the same memory space.

Optionally, a screening filter which is associated with the central server 450 may be provided for screening the character strings which are received from the content servers to eliminate words that may have been improperly designated, e.g., including misspelled words, or common place words such as "the" or "a" which should not be linked to.

Figure 6:
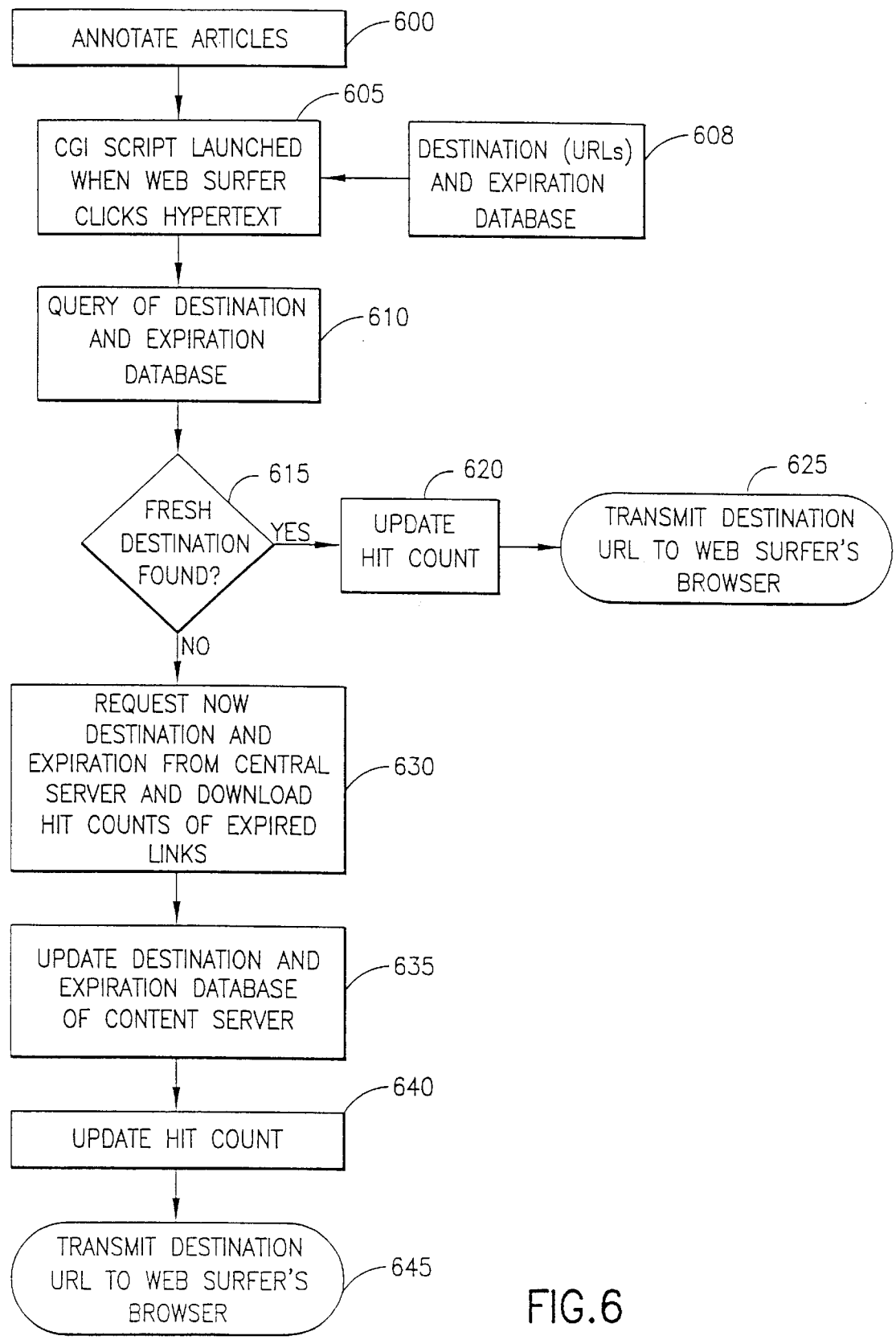
FIG. 6 illustrates a process flow for a content server in accordance with the present invention.

FIG. 6 illustrates a process flow for a content server in accordance with the present invention. The desired effects of the Dynamic Decision Filter™ are produced by two distinct processes residing on different computers. Part A resides on each content server, while Part B resides on the central server. Each part of the Dynamic Decision Filter™ may be a script which is written in Practical Extraction and Reporting Language (PERL), and which is called by the HTML anchors in the files output by the Intelligent Annotator™. When called by an HTML anchor, the filter dynamically determines a destination page for the hyperlink. This portion of the Dynamic Decision Filter™ first queries the local content server's destination and expiration database. If a fresh (i.e., unexpired) destination is found, that destination is immediately transmitted to the requesting browser. If the database has no destination or a stale (expired) destination, then the script launches Part B of the Dynamic Decision Filter™ that resides on the central server. At the appropriate stage, the Part A script also updates the link hit count at the content server.

As summarized in FIG. 6, at box 600, articles are annotated with hypertext links as discussed previously. At box 605, a CGI script which is Part A of the Dynamic Decision Filter™ is launched when a Web surfer clicks on the hypertext of an annotated article which is stored on a content server. As shown at box 608, the CGI script is responsive to the destination and expiration database. At box 610, the destination and expiration database of the content server is queried using the linkable character string of the hypertext to determine a "fresh" (unexpired destination address.

At box 615, if a fresh destination address is found, a hit count is updated at box 620, and the destination address (such as a URL) is transmitted to the Web surfer's browser at box 625.

If no fresh destination is found, at box 630, a new destination address and expiration date are requested from the central server. At the same time, the hit count data is optionally downloaded from the content server to the central server. Box 630 is shaded to represent a link between the Part A script of the content server and the Part B script of the central server.

Note that the new destination address received from the central server may be the same as the old, expired address, but will have a new expiration date.

At box 635, the destination and expiration database of the content server is updated, and at box 640, the hit count is updated. At box 645, the destination address (URL) is transmitted to the Web surfer's browser.

Figure 7:
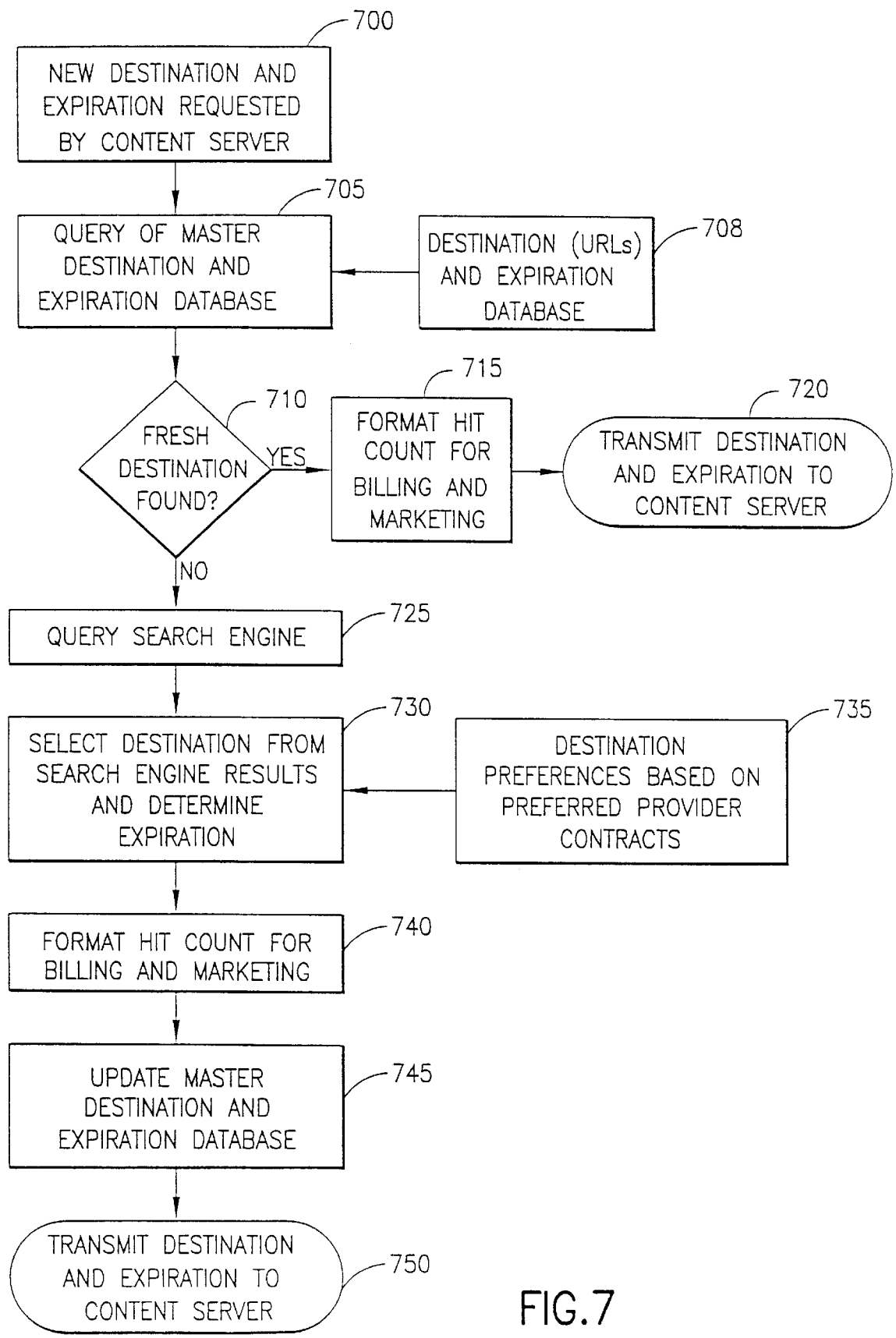
FIG. 7 illustrates a process flow for a central server in accordance with the present invention.

FIG. 7 illustrates a process flow for a central server in accordance with the present invention. Part B of the Dynamic Decision Filter™ is a PERL script residing on the central server. This script synthesizes search engine results and destination preferences into a single destination address and expiration data which is transmitted to Part A of the Dynamic Destination Filter™ at the content server. The central server assures that the chosen destination is relevant to the hyperlinked text, but will give preference to the relevant destinations of preferred provider sites. Links between the central server and the content servers are shown in gray boxes.

Expiration dates for each destination will be determined by the central server. The calculated expiration dates will optimize the tradeoff between bandwidth at the central server and dynamic control over hyperlink destinations. If a destination expires more frequently, then the content servers query the central server more often, and more bandwidth is needed.

Although content sites may produce annotated articles on a daily basis, any new links created that are based on destination addresses already stored at the content server will not require communication with the central server until the established expiration date passes.

The script on the central server also formats hit counts for billing and marketing purposes. Thus, each preferred provider can be billed accurately for the number of hits generated. Moreover, the central server can gather link hit data even for hits to non-preferred destination addresses, if desired.

As shown in FIG. 7, at box 700, a new destination address and expiration date are requested by a content server. At box 705, the master destination address and expiration database at the central server is queried using a character string received from the content server. The querying step is responsive to data in the destination address and expiration date database, as indicated at box 708.

At box 710, if a fresh destination address is found, a hit count is formatted for billing and marketing purposes at box 715, and the destination address and expiration date data are transmitted to the content server at box 720.

At box 725, a search engine which may be external to the central server is queried using the character string received from the content server as a search term, optionally along with other search terms. At box 730, a destination address is selected from the search engine results, and an expiration date or period is assigned to the selected destination address. The selection of a destination address is optionally responsive to destination preferences which are based on preferred provider contracts, at box 735.

At box 740, a hit count is formatted for billing and marketing purposes. At box 745, the master destination address and expiration date database at the central server is updated with the destination address found in the search. Finally, at box 750, the new destination address and expiration date data are transmitted from the central server to the particular content server which had requested the new destination address.

Note that the other content servers will be provided with the updated information according to an intermittent maintenance schedule of the central server, wherein each content server is updated with new destination addresses and linkable character strings. As previously indicated, this periodic update may be daily, weekly or monthly for example.

The hypertext of the present invention, termed Dynamic Hypertext™, provides numerous benefits relative to conventional hypertext. First, the Dynamic Hypertext™ is easier to insert and maintain than conventional hypertext. For standard HTML hyperlinks, a Web administrator first has to locate a desirable destination page and then use an HTML editor to add the hyperlinks into the page. If the destinations move, the administrator must use an HTML editor again to manually update each hyperlink. This can be a tedious process, especially for large media sites with content which changes daily.

In accordance with the present invention, the Intelligent Annotator™ and Dynamic Decision Filter™ combine to completely automate the process of inserting an updating hyperlinks. A text file is entered into the annotator, and an HTML file which is complete with hyperlinks is output. Subsequently, if destination preferences change, the new preferences can be entered at the central server, and all of the links at the various content servers will be automatically updated.

Second, Dynamic Hypertext™ can build advertising directly into HTML hyperlinks. Preferential treatment in the Dynamic Decision Filter™ can be sold much like standard Web advertising. For example, when searching for a common term such as "Intel" with a standard search engine, thousands of pages are returned. Several of these refer to the "Intel" page of various stock quote services. The Web page author desiring to link to an Intel stock quote chooses which stock quote service to use somewhat arbitrarily. With Dynamic Hypertext™, the central server can set a preference for stock quote services based on current advertising contracts such that all links from the stock quote category are automatically referred to the preferred provider.

When the contract for the current provider expires, it can be replaced by a contract with another stock quote service, and all of the links can be updated with the new preference simply by adjusting the preferences on the central server.

Third, Dynamic Hypertext™ provides advertising revenue for the central server administrator without the costs of creating and maintaining content.

Accordingly, it can be seen that the present invention provides a system for automatically providing hypertext links for character strings at a content server. A hypertext anchor code may be inserted into the text file itself, thereby forming a new markup language file, or an anchor code may be associated with the character strings of the text file using relational database programming techniques or any other known programming technique. Additionally, a central server provides central control of the links of text files of a plurality of content servers in an information network such as the Internet. The central server intermittently updates each content server with new character strings and/or destination addresses, and also receives new character strings from the content server. This may be done automatically on an off-line basis, e.g., without requiring input from the content server administrators.

However, if desired, each content server can query the central server on a real-time basis (e.g., as a file is being annotated) to obtain a destination address for a character string which has no valid corresponding destination address at the content server.

The central server responds to such queries by searching its master databases, and using a search engine if required, to obtain a destination address.

Hit count data is maintained at the content servers and transmitted to the central server intermittently. For example, the hit count data may be transmitted from a particular content server to the central server when the central server is being queried by that particular content server for other reasons, e.g., to obtain an updated destination address, or during a maintenance mode.

Conventional techniques and hardware which will be apparent to those skilled in the art may be used for communicating data between, and within, the content server and the central server. Moreover, the invention may be adapted for use with various software programming systems. For example, while the use of CGI scripts has been mentioned in an example embodiment, other programming tools may be used.

Additionally, while the invention has been described for use in connection with the Internet, the invention may be adapted or use with virtually any computer network, including intranets, local area networks, and wide area networks.

Although the invention has been described in connection with various specific embodiments, those skilled in the art will appreciate that numerous adaptations and modifications may be made thereto without departing from the spirit and scope of the invention as set forth in the claims.

The scope of the invention is indicated by the appended claims, and not the foregoing description. All changes which come within the meaning and range of equivalency of the claims are to be embraced within their scope.

What is claimed is:

1. A method for annotating text with multiple hyperlinks, the method comprising:

parsing the text to identify a keyword to be annotated;

adding a first visual indicator to indicate the availability of a first hyperlink relating to the keyword; and adding a second visual indicator to indicate the availability of a second hyperlink relating to the keyword;

wherein the first and second indicators include text;

wherein at least one indicator is proximate to the identified keyword;

wherein at least two hypertext words are used to indicate at least two hyperlinks associated with a keyword in the text;

wherein the hypertext words are embedded within the text adjacent to the keyword;

wherein a first hypertext word is "home" and is used to indicate a hyperlink to a web site relating to the keyword; and wherein a second hypertext word is "quote" and is used to indicate a hyperlink to a web site relating to financial information about the keyword.

2. The method of claim 1, wherein the first and second indicators include images.

3. The method of claim 2, wherein at least one indicator is proximate to the identified keyword.

* * * * *